US011215223B2

(12) United States Patent
Luo et al.

(10) Patent No.: US 11,215,223 B2
(45) Date of Patent: Jan. 4, 2022

(54) BEARING ASSEMBLY, BEARING ASSEMBLY MOUNTING STRUCTURE AND AIR BLOWING APPARATUS

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventors: Hanbing Luo, Zhuhai (CN); Lin Cao, Zhuhai (CN); Wenkang Pan, Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 0 days.

(21) Appl. No.: 16/646,670

(22) PCT Filed: Sep. 4, 2018

(86) PCT No.: PCT/CN2018/103940
§ 371 (c)(1),
(2) Date: Mar. 12, 2020

(87) PCT Pub. No.: WO2019/128294
PCT Pub. Date: Jul. 4, 2019

(65) Prior Publication Data
US 2020/0408248 A1 Dec. 31, 2020

(30) Foreign Application Priority Data
Dec. 29, 2017 (CN) .......................... 201711479394.3

(51) Int. Cl.
F16C 17/10 (2006.01)
F04D 29/043 (2006.01)
(Continued)

(52) U.S. Cl.
CPC ............ F16C 17/10 (2013.01); F04D 29/043 (2013.01); F04D 29/046 (2013.01);
(Continued)

(58) Field of Classification Search
CPC .... F04D 29/043; F04D 29/045; F04D 29/056; F04D 29/263; F16C 17/10; F16C 17/105;
(Continued)

(56) References Cited

U.S. PATENT DOCUMENTS 6,749,342 B1 * 6/2004 Leins .................... F16C 27/066
384/536
2016/0097425 A1 * 4/2016 Charmillot .............. F16C 33/60
384/570

FOREIGN PATENT DOCUMENTS

| CN | 1360647 A | 7/2002 |
|---|---|---|
| CN | 202360447 U | 8/2012 |
| CN | 207892873 U | 9/2018 |

OTHER PUBLICATIONS

International Search Report for corresponding International Application No. PCT/CN2018/103940, dated Nov. 14, 2018, 2 pages.

* cited by examiner

Primary Examiner — Phillip A Johnson
(74) Attorney, Agent, or Firm — Armstrong Teasdale LLP

(57) ABSTRACT

Provided are a bearing assembly, a bearing assembly mounting structure and an air blowing apparatus. The bearing assembly includes: a bearing sleeve including an inner assembling face, and a bearing mounted into the bearing sleeve from an axial side of the bearing sleeve and including an outer assembling face corresponding to the inner assembling face. The inner assembling face and/or the outer assembling face is provided with a supporting structure protruding toward an opposing assembling face and cooperating with the opposing assembling face in a contacting (Continued)

manner, and the supporting structure is symmetrically disposed in a peripheral direction of the assembling face where the supporting structure is located.

21 Claims, 3 Drawing Sheets

(51) Int. Cl.
 *F04D 29/046* (2006.01)
 *F04D 29/26* (2006.01)
 *F16C 35/02* (2006.01)
 *F16C 23/04* (2006.01)
(52) U.S. Cl.
 CPC .......... *F04D 29/263* (2013.01); *F16C 23/043* (2013.01); *F16C 35/02* (2013.01); *F16C 2360/46* (2013.01)
(58) Field of Classification Search
 CPC ...... F16C 23/043; F16C 23/045; F16C 35/02; F16C 35/077; F16C 35/10; F16C 2360/46
 See application file for complete search history.

BEARING ASSEMBLY, BEARING ASSEMBLY MOUNTING STRUCTURE AND AIR BLOWING APPARATUS

CROSS-REFERENCE TO RELATED APPLICATIONS

The present disclosure is a national stage application of International Patent Application No. PCT/CN2018/103940, filed on Sep. 4, 2018, which claims priority to Chinese Patent Application No. 201711479394.3, filed on Dec. 29, 2017, and entitled "Bearing assembly, bearing assembly mounting structure and air blowing apparatus," the contents of which are hereby incorporated by reference in their entirety.

TECHNICAL FIELD

The present disclosure relates to a technical field of household electric appliances, and in particular to a bearing assembly, a bearing assembly mounting structure and an air blowing apparatus.

BACKGROUND

A tower fan is a fan in the market at present, and is favored by a majority of consumers due to its unique columnar shape and small occupied area during use. Because the tower fan is slim and high, a cross-flow blade is selected only, as to generate wind power when driven depending on a motor. Therefore, the cross-flow blade is an essential part of the tower fan. During assembling of a whole machine, a side of the cross-flow blade is connected with the motor, and the other side is fixed on a housing by means of a blade bearing.

A blade bearing assembly includes a blade bearing and a blade bearing sleeve. The blade bearing assembly known to the inventors is wholly presented as a cylinder at present, and an external cylindrical surface of the blade bearing fits an internal cylindrical surface of the blade bearing sleeve in a contacting manner when mounted into the blade bearing sleeve, and the blade bearing assembly vibrates during working if the two cylindrical surfaces are not flush with each other. Therefore, the two cylindrical surfaces need to have high machining accuracy.

SUMMARY

Some embodiments of the present disclosure provide a bearing assembly, as to solve the problem that the bearing assembly known to the inventors has a high requirement on machining accuracy of two cylindrical surfaces of a bearing and a bearing sleeve.

Some embodiments of the present disclosure provide an air blowing apparatus with the abovementioned bearing assembly, as to solve the problem that the air blowing apparatus known to the inventors has a high requirement on machining accuracy of two cylindrical surfaces of a bearing and a bearing sleeve of the bearing assembly.

Some embodiments of the present disclosure provide a bearing assembly, including: a bearing sleeve including an inner assembling face, and a bearing mounted into the bearing sleeve from an axial side of the bearing sleeve and including an outer assembling face corresponding to the inner assembling face, wherein, the inner assembling face and/or the outer assembling face is provided with a supporting structure protruding toward an opposing assembling face and cooperating with the opposing assembling face in a contacting manner, and the supporting structure is symmetrically disposed in a peripheral direction of the assembling face where the supporting structure is located.

In an exemplary embodiment, the supporting structure includes a plurality of ribs which are disposed along an axial direction of the assembling face where the supporting structure is located.

In an exemplary embodiment, the plurality of ribs are uniformly disposed in the peripheral direction of the assembling face where the plurality of ribs are located.

In an exemplary embodiment, the plurality of ribs are provided on the outer assembling face of the bearing, and each of the plurality of ribs is provided with a first chamfer angle on a front end along a direction of mounting the bearing in.

In an exemplary embodiment, the supporting structure includes a plurality of round bulges.

In an exemplary embodiment, the supporting structure further includes an axial limiting structure disposed between the bearing sleeve and the bearing and configured to limit relative movement of the bearing sleeve and the bearing after assembling in an axial direction.

In an exemplary embodiment, the axial limiting structure is positioned on a front side of the supporting structure in the direction of mounting the bearing in.

In an exemplary embodiment, the axial limiting structure includes a convex section moulded on the inner assembling face and a groove section moulded on the outer assembling face, and the convex section cooperates with the groove section in a clamping manner after the bearing is mounted into the bearing sleeve.

In an exemplary embodiment, the convex section is provided with a supporting boss protruding toward the groove section and cooperating with a surface of the groove section on an opposite side in a contacting manner, so that a gap is formed between surfaces of the convex section and the groove section.

In an exemplary embodiment, the bearing assembly comprises a second chamfer angle provided on a front end of the bearing.

In an exemplary embodiment, the inner assembling face and the outer assembling face are cylindrical surfaces.

Some embodiments of the present disclosure provide a bearing assembly mounting structure, including a housing and the abovementioned bearing assembly. The housing is provided with a bearing seat and a first buckle, and the baring seat, the first buckle and the housing are integrally moulded. The bearing assembly is provided with a second buckle, and the second buckle cooperates with the first buckle when the bearing assembly is assembled to the bearing seat to form a buckle structure of locking the bearing assembly.

In an exemplary embodiment, the bearing assembly is mounted into the bearing seat along a preset inserting direction, the first buckle is disposed on an inner side of the bearing seat along the preset inserting direction. The bearing assembly is provided with an extension arm extending toward the bearing seat, and the second buckle is moulded on the extension arm. When the bearing assembly is mounted into the bearing seat, the extension arm extends into the inner side of the bearing seat, as to make the second buckle and the first buckle form the buckle structure.

In an exemplary embodiment, a first supporting wall and a second supporting wall, which are provided in parallel and disposed at intervals, are moulded on the housing. The bearing seat is formed on a corresponding end of the first supporting wall and a corresponding end of the second supporting wall.

In an exemplary embodiment, the second buckles are moulded on inner walls corresponding to the first supporting wall and the second supporting wall, respectively. The extension arm includes a first extension arm and a second extension arm which are disposed on two axial ends of the bearing assembly, and the second buckle is moulded on the first extension arm and the second extension arm.

In an exemplary embodiment, the first extension arm and the second extension arm are positioned on inner sides or outer sides of the first supporting wall and the second supporting wall, and cooperate with corresponding inner walls or outer walls of the first supporting wall and the second supporting wall.

In an exemplary embodiment, at least one of the first buckle and the second buckle is provided with a guiding slope configured to guide the first buckle and the second buckle to form the buckle structure.

In an exemplary embodiment, the first buckle is a first clamping bulge or a first clamping groove, and the second buckle is a second clamping groove cooperating with the first clamping bulge or a second clamping bulge cooperating with the first clamping groove.

In an exemplary embodiment, the at least one of the first buckle and the second buckle is an elastic buckle.

In an exemplary embodiment, the bearing assembly is the one cooperating with a blade shaft of a cross-flow blade.

In an exemplary embodiment, the bearing assembly includes a bearing sleeve and a bearing, and the bearing is detachably mounted inside the bearing sleeve.

Some embodiments of the present disclosure provide an air blowing apparatus, including a blade and the abovementioned bearing assembly mounting structure. The blade has a blade shaft and is mounted inside a housing, and a bearing assembly supports the blade shaft and cooperates with the blade shaft in a rotating manner.

In an exemplary embodiment, the air blowing apparatus is a tower fan.

Some embodiments of the present disclosure have the following advantages.

1. With the adoption of the bearing assembly provided by some embodiments of the present disclosure, the inner assembling face and/or outer assembling face of the bearing sleeve is provided with the supporting structure protruding toward the opposing assembling face and cooperating with the opposing assembling face in the contacting manner, so that fitting of two assembling faces of the bearing sleeve and the bearing known to the inventors is changed as fitting of the supporting structure and the opposing assembling face. With the adoption of the configuration, vibration because the two assembling faces are not flush with each other after the bearing is mounted into the bearing sleeve is avoided, and a requirement on machining accuracy of the two assembling faces of the bearing and the bearing sleeve is lowered. Meanwhile, the supporting structure of the bearing assembly of the present disclosure is symmetrically disposed in the peripheral direction of the assembling face where the supporting structure is located. With the adoption of the configuration, that a center of the bearing is consistent with that of the bearing sleeve is ensured.

2. With the adoption of the bearing assembly provided by some embodiments of the present disclosure, the supporting structure thereof includes a plurality of ribs processed on the outer assembling face of the bearing. From a point of view of a process, processing of the ribs on the outer assembling face of the bearing, compared with processing of the ribs on the inner assembling face of the bearing, is much easier, and production cost is much less.

3. With the adoption of the bearing assembly provided by some embodiments of the present disclosure, the front ends of the plurality of ribs are provided with the chamfer angles, so that the ribs become wedge-shaped ribs. The configuration plays a role of guiding the ribs for assembling, thereby facilitating the bearing to be mounted into the bearing sleeve.

4. With the adoption of the bearing assembly provided by some embodiments of the present disclosure, the convex section of the axial limiting structure thereof is provided with the supporting boss protruding toward the groove section and cooperating with the surface of the groove section on the opposite side in the contacting manner, so as to make the surfaces of the convex section and the groove section form the gap. With the adoption of the configuration, a contact area between the surfaces of the convex section and the groove section is reduced, and the problem that the surfaces of the convex section and the groove section are not flush with each other due to the machining accuracy is avoided.

5. With the adoption of the bearing assembly mounting structure provided by some embodiments of the present disclosure, the housing is provided with the bearing seat and the first buckle, the bearing assembly is provided with the second buckle, in this way fixation of the bearing assembly is achieved through the buckle structure formed by the first buckle and the second buckle when assembling the bearing assembly, a nailing process is omitted, and production efficiency is improved. In addition, with the adoption of the bearing assembly mounting structure provided by some embodiments of the present disclosure, the first buckle, the bearing seat and the housing are integrally moulded, therefore the bearing seat does not need to be separately assembled during assembling, an assembling step is omitted, and the production efficiency is further improved. Moreover, a mould of the bearing seat does not need to be fabricated separately, thereby reducing the production cost.

6. With the adoption of the bearing assembly mounting structure provided by some embodiments of the present disclosure, the bearing assembly is provided with the first extension arm and the second extension arm extending toward the bearing seat, in this way the first extension arm and the second extension arm are positioned on the inner sides or the outer sides of the first supporting wall and the second supporting wall forming the bearing seat at the same time when the bearing assembly is mounted into the bearing seat. Moreover, the first extension arm and the second extension arm fit the corresponding first supporting wall and the corresponding second supporting wall respectively, thereby preventing the bearing assembly from vibrating left and right when mounted into the bearing seat.

7. With the adoption of the bearing assembly mounting structure provided by some embodiments of the present disclosure, the at least one of the first buckle and the second buckle is provided with the guiding slope configured to guide the two to form the buckle structure, in this way the first buckle and the second buckle are more easily form buckled fitting when the bearing assembly is mounted into the bearing seat, and assembling efficiency is improved.

8. With the adoption of the bearing assembly mounting structure provided by some embodiments of the present disclosure, the at least one of the first buckle and the second buckle is provided as the elastic buckle, in this way the first buckle and/or the second buckle is deformed elastically during assembling when the bearing assembly is mounted into the bearing seat. Therefore, on one hand, the first buckle and the second buckle are facilitated to form the buckled fitting, and on the other hand, the buckle after being deformed make the buckle structure achieve more tight fitting through elastic force of deformation.

BRIEF DESCRIPTION OF THE DRAWINGS

Features and advantages of the present disclosure may be more clearly understood with reference to drawings, and the drawings are exemplary and should not be understood as any restriction on the present disclosure. In the drawings.

Reference numbers: 1, Housing; 11, Bearing seat; 12, First buckle; 13, First supporting wall; 14, Second supporting wall; 2, Bearing assembly; 21, Second buckle; 22, First extension arm; 23, Second extension arm; 24, Guiding slope; 25, Bearing sleeve; 251, Inner assembling face; 2511, Convex section; 2511a, Supporting boss; 26, Bearing; 261, Outer assembling face; 2611, Groove section; 262, Second chamfer angle; 31, Blade; 32, Blade shaft; 33, Rib; 331, First chamfer angle; 35, Gap.

DETAILED DESCRIPTION OF THE EMBODIMENTS

Embodiments of the present disclosure will be described below in detail in combination with drawings.

Embodiment 1

Figure 1:
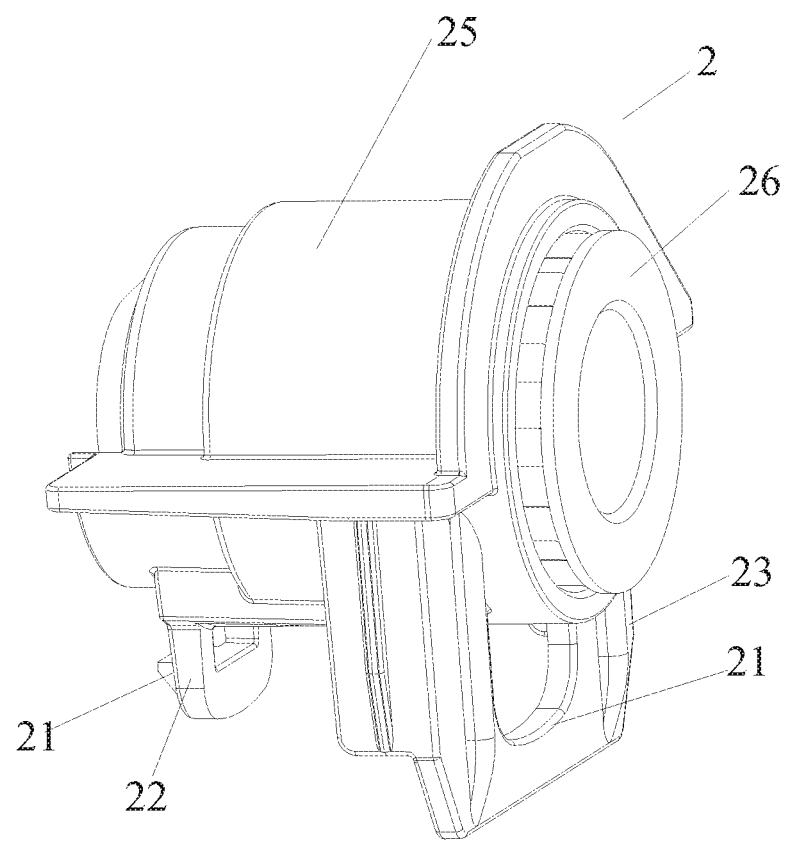
FIG. 1 is a structure diagram of a bearing assembly of an embodiment 1.
Figure 2:
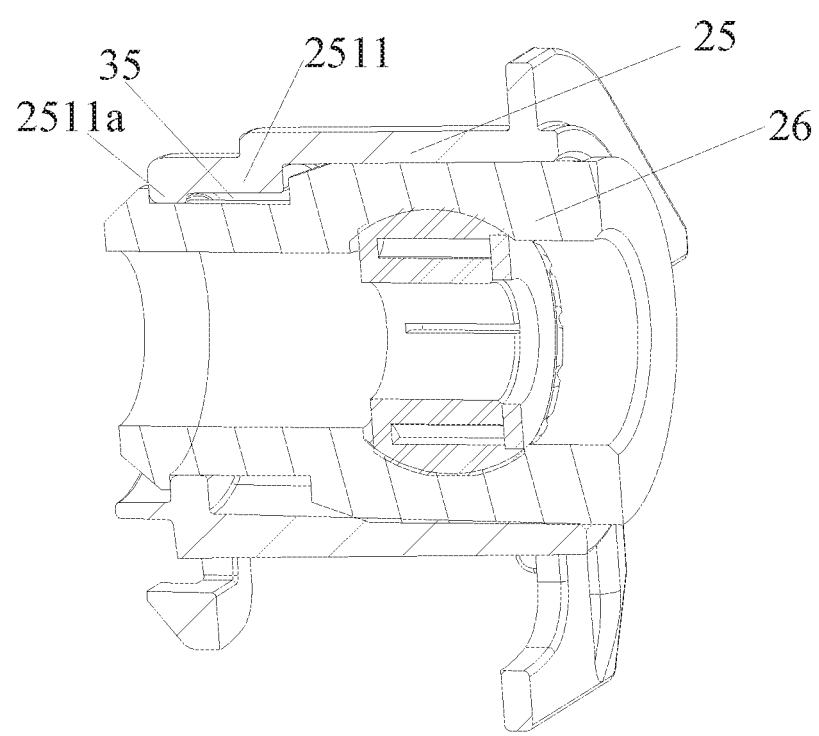
FIG. 2 is a section view of a bearing assembly of an embodiment 1.
Figure 3:
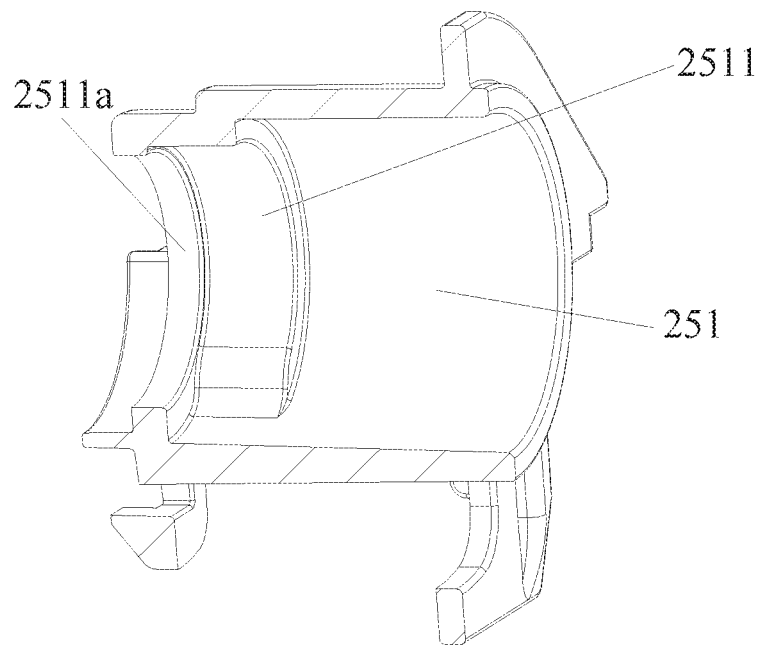
FIG. 3 is a section view of a bearing sleeve of a bearing assembly of an embodiment 1.
Figure 4:
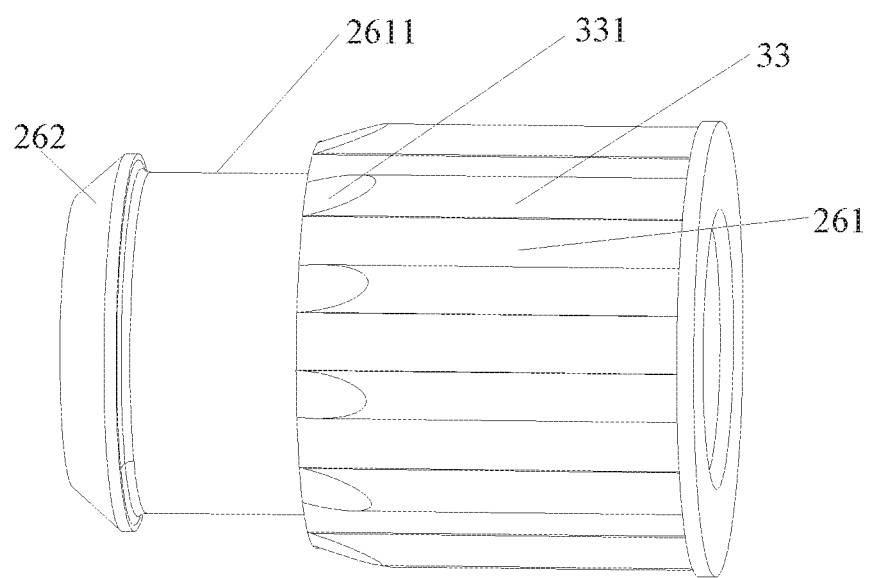
FIG. 4 is a structure diagram of a bearing of a bearing assembly of an embodiment 1.

FIG. 1 is a structure diagram of a bearing assembly of the embodiment. FIG. 2 is a section view of a bearing assembly of an embodiment 1. FIG. 3 is a section view of a bearing sleeve of a bearing assembly of an embodiment 1. FIG. 4 is a structure diagram of a bearing of a bearing assembly of an embodiment 1. As shown in FIG. 1-FIG. 4, some embodiments provide a bearing assembly which is applied to a cross-flow blade of a tower fan. The bearing assembly includes a bearing sleeve 25 including an inner assembling face 251 and a bearing 26 including an outer assembling face 261. The bearing 26 is mounted into the bearing sleeve 25 from an axial side of the bearing sleeve 25. In order to prevent the tower fan from vibrating during working because the outer assembling face 261 of the bearing 26 is not flush with the inner assembling face 251 of the bearing sleeve when mounted into the bearing sleeve 25, in some embodiments, the outer assembling face 261 of the bearing 26 is provided with a supporting structure protruding toward the inner assembling face 251 on an opposite side, and the supporting structure cooperates with the inner assembling face 251 on the opposite side in a contacting manner when the bearing 26 is mounted into the bearing sleeve 25. With the adoption of the configuration, vibration caused by the two assembling faces are not flush with each other when the bearing is mounted into the bearing sleeve is avoided, and a requirement on machining accuracy of the two assembling faces of the bearing and the bearing sleeve is lowered. Meanwhile, in some embodiments, the supporting structure of the bearing assembly is symmetrically disposed in a peripheral direction of the assembling face where the supporting structure is located. With the adoption of the configuration, that a center of the bearing is consistent with that of the bearing sleeve is ensured.

In some embodiments, the outer assembling face 261 and the inner assembling face 251 are cylindrical surfaces.

In some embodiments, as shown in FIG. 4, the supporting structure includes a plurality of ribs 33 which are disposed in a peripheral direction of the outer assembling face 261 of the bearing 26. Each rib 33 extends along an axial direction of the bearing 26. In order to facilitate processing and assembling of the plurality of ribs 33, the plurality of ribs 33 are uniformly disposed in the peripheral direction of the outer assembling face 261 at intervals, and moulded through a mode of turning.

In some embodiments, in order to improve assembling efficiency of the bearing 26 and the bearing sleeve 25, the plurality of ribs 33 are provided with a first chamfer angle 331 on a front end along a direction of mounting the bearing 26 in. The first chamfer angle 331 plays a role of guiding. It is to be noted that the bearing is mounted into the bearing sleeve from an opening on the axial side of the bearing sleeve, and the direction of mounting in is the one allowing the bearing to be mounted into the bearing sleeve from the outside. The front end of each of the multiple ribs 33 is one end allowing the rib to enter into the bearing sleeve first along the bearing.

In order to prevent the bearing 26 and the bearing sleeve 25 from relative movement in the axial direction when the bearing 26 is mounted into the bearing sleeve 25, in some embodiments, as shown in FIG. 2, an axial limiting structure used to limit axial relative movement of the bearing sleeve and the bearing after assembling is disposed between the bearing sleeve and the bearing. In some embodiments, the axial limiting structure is positioned on a front side of the supporting structure in the direction of mounting the bearing in.

In some embodiments, the axial limiting structure includes a convex section 2511 moulded on the inner assembling face 251 and a groove section 2611 moulded on the outer assembling face 261. The convex section 2511 cooperates with the groove section 2611 in a clamping manner after the bearing is mounted into the bearing sleeve. Through the fitting of the convex section 2511 and the groove section 2611 in the clamping manner, relative movement of the bearing 26 and the bearing sleeve 25 in the axial direction is prevented.

From FIG. 3, through configuration of the convex section 2511, the inner assembling face 251 of the bearing sleeve becomes a multi-stage stepped structure. Through configuration of the groove section 2611, the outer assembling face 261 of the bearing 26 becomes a three-stage structure. The multi-stage stepped structure cooperates with the three-stage structure of the bearing 26 when the bearing 26 is mounted into the bearing sleeve 25. The ribs 33 are disposed on a final stage of the three-stage structure of the bearing.

In order to reduce a contact area between surfaces of the convex section 2511 and the groove section 2611, as shown in FIG. 2, in some embodiments, the convex section 2511 is provided with a supporting boss 2511a protruding toward the groove section 2611 and cooperating with the surface of the groove section 2611 on an opposite side in a contacting manner. When the bearing 26 is mounted into the bearing sleeve 25, the supporting boss 2511a is supported on the surface of the groove section 2611 of the bearing, in this way a gap 35 is formed between the surfaces of the convex section 2511 and the groove section 2611. With the adoption of the configuration, the contact area between the surface of the convex section 2511 and that of the groove section 2611 is reduced, and the problem that the surfaces of the convex section 2511 and the groove section 2611 are not flush with each other due to machining accuracy is avoided.

In some embodiments, in order to facilitate assembling of the bearing 26, a front end of the bearing 26 is provided with a second chamfer angle 262.

In some embodiments of the present disclosure, the groove section 2611 of the bearing 26 is adjacent to a rear side of the first chamfer angle 331. During assembling the bearing, the front end of the bearing extends outward from an opening of a front end of the bearing sleeve 25 through the first chamfer angle 331, and a side wall of the groove section 2611 on the rear side of the first chamfer angle 331 is upended on a front end surface of the bearing sleeve 25.

In some embodiments, the abovementioned supporting structure further is disposed on the inner assembling face 251 of the bearing sleeve.

In some embodiments, the abovementioned supporting structure further is disposed on the inner assembling face 251 of the bearing sleeve 25 and the outer assembling face 261 of the bearing 26. For example, the plurality of ribs 33 are taken as the supporting structure, herein part of the ribs 33 are moulded on the inner assembling face 251 of the bearing sleeve 25, and part of the ribs 33 are moulded on the outer assembling face 261 of the bearing 26, the ribs 33 on the bearing sleeve 25 are staggered with the ribs 33 on the bearing 26, as to cooperate with the assembling faces on the opposite side in a contacting manner, respectively.

In some embodiments, the abovementioned supporting structure further includes a plurality of round bulges moulded on an assembling face where the round bulges are located.

It is to be finally noted that the bearing assembly of the embodiments is not limited to be applied to the cross-flow blade of the tower fan.

Embodiment 2

Figure 5:
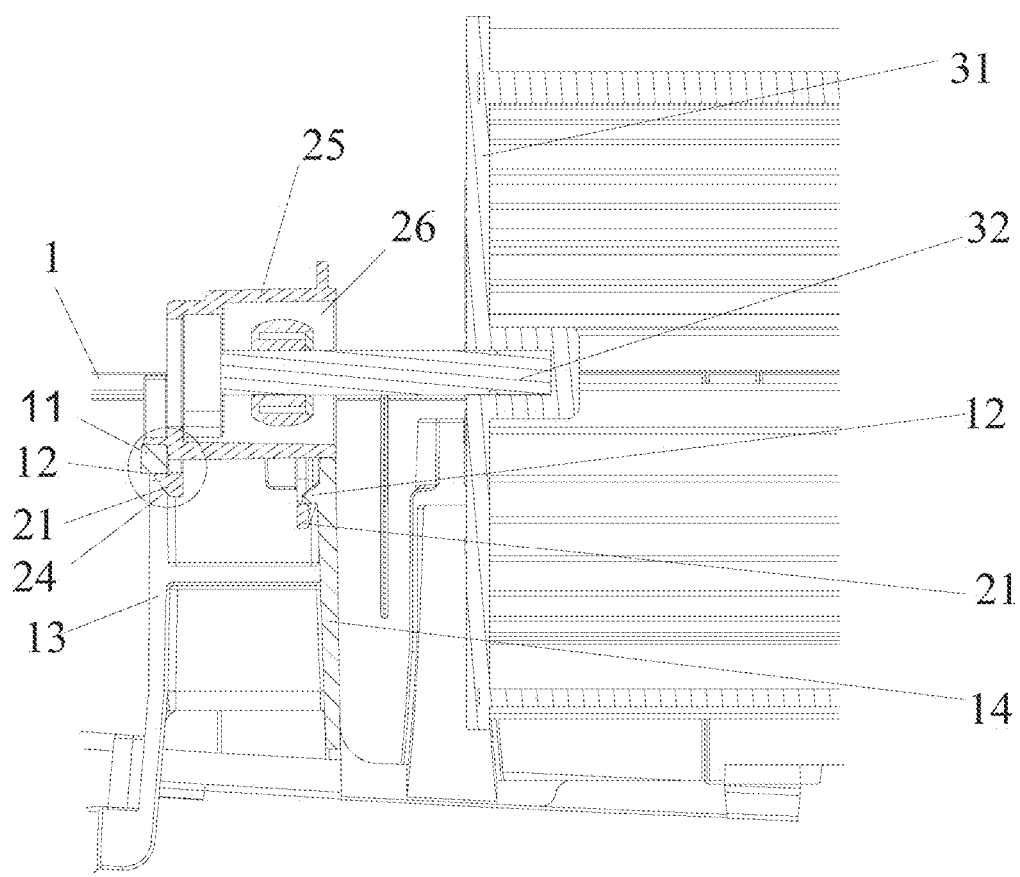
FIG. 5 is a structure diagram of a bearing assembly mounting structure of an embodiment 2.
Figure 6:
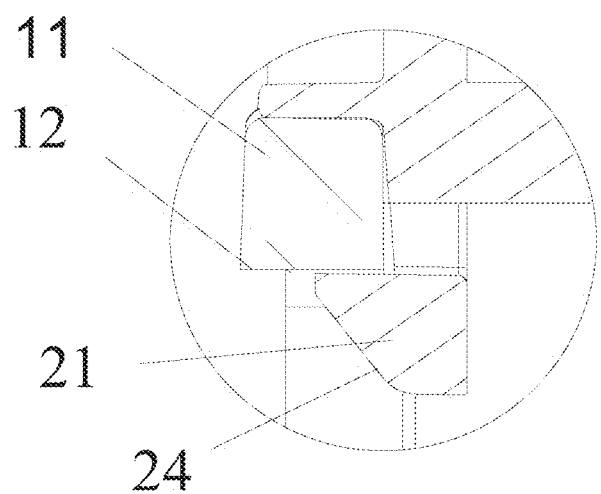
FIG. 6 illustrates a partial enlarged schematic diagram of FIG. 5.

FIG. 1 shows a structure diagram of a bearing assembly 2 of the embodiment, and FIG. 5 shows a schematic diagram of an assembling diagram of a bearing assembly 2 and a housing 1 of the embodiment. As shown in FIG. 1 and FIG. 5, some embodiments provide a bearing assembly mounting structure for an air blowing apparatus, and the bearing assembly mounting structure includes a housing 1 and the bearing assembly 2 of the embodiment 1. The bearing assembly 2 includes a bearing sleeve 25 and a bearing 26, and the bearing 26 is detachably mounted in the bearing sleeve 25. The bearing assembly 2 is the one cooperating with a blade shaft of a cross-flow blade. The housing 1 is provided with a bearing seat 11 and a first buckle 12, and the bearing seat 11, the first buckle 12 and the housing 1 are integrally moulded. The bearing assembly 12 is provided with a second buckle 21, and the second buckle 21 cooperates with the first buckle 12 when the bearing assembly 2 is assembled to the bearing seat 11 to form a buckle structure for locking the bearing assembly 2. The housing 1 is provided with the bearing seat 11 and the first buckle 12, and the bearing assembly 2 is provided with the second buckle 21, so that the bearing assembly 2 is fixed through the buckle structure formed by the first buckle 12 and the second buckle 21 when assembling the bearing assembly 2, and accordingly a nailing process is omitted and production efficiency is improved. In addition, with the adoption of the bearing assembly mounting structure provided by some embodiments, the first buckle 12, the bearing seat 11 and the housing 1 are integrally moulded, in this way the bearing seat 11 does not need to be separately assembled during assembling, the assembling step is saved, and the production efficiency is further improved. Moreover, a mould of the bearing seat 11 does not need to be fabricated separately, thereby reducing production cost.

In some embodiments, the bearing assembly 2 is mounted into the bearing seat 11 along a preset inserting direction, and the preset inserting direction is adjusted according to an actual assembling status of the bearing assembly mounting structure. In the embodiments, as shown in FIG. 2, the preset inserting direction is a vertical direction from top to bottom. In other embodiments, according to different actual application situation, an inserting direction is different, for example, from bottom to top, as an alternative, from front to back or from back to front.

In some embodiments, as shown in FIG. 1 and FIG. 5, the first buckle 12 is disposed under the bearing seat 11, an extension arm extending toward the bearing seat 11 is moulded under the bearing assembly 2, and the second buckle 21 is moulded on a bottom end of the extension arm. When the bearing assembly 2 is mounted into the bearing seat 11 from top to bottom, the extension arm extends under the bearing seat 11 until the second buckle 21 cooperates with the first buckle 12 to form the buckle structure.

In some embodiments, as shown in FIG. 1 and FIG. 5, a first supporting wall 13 and a second supporting wall 14, which are disposed in parallel and provided at intervals, are moulded on the housing 1, and the bearing seat 11 is formed on a corresponding end of the first supporting wall 13 and a corresponding end of the second supporting wall 14. The second buckles 21 are moulded on inner walls corresponding to the first supporting wall 13 and the second supporting wall 14, respectively. The extension arm includes a first extension arm 22 and a second extension arm 23 which are disposed on two axial ends of the bearing assembly 2, and the second buckle 21 is moulded on the first extension arm 22 and the second extension arm 23. The first extension arm 22 and the second extension arm 23 are positioned on inner sides or outer sides of the first supporting wall 13 and the second supporting wall 14, and fit corresponding inner walls or outer walls of the first supporting wall 13 and the second supporting wall 14. The bearing assembly 2 is provided with the first extension arm 22 and the second extension arm 23 extending toward the bearing seat 11, so that the first extension arm 22 and the second extension arm 23 are positioned on the outer sides or inner sides of the first supporting wall 13 and the second supporting wall 14 forming the bearing seat 11 at the same time when the bearing assembly 2 is mounted into the bearing seat 11. Furthermore, the first extension arm 22 and the second extension arm 23 correspondingly fit the first supporting wall 13 and the second supporting wall 14 respectively, thereby preventing the bearing assembly 2 from shaking left and right after mounted into the bearing seat 11.

In addition, in some embodiments, in order to facilitate assembling of the bearing assembly 2 and the bearing seat 11, the first buckle 12 and the second buckle 21 are provided with a guiding slope 24 configured to guide the two to form the buckle structure. Through the guiding slope 24, the first buckle 12 and the second buckle 21 are easily form buckled fitting when the bearing assembly 2 is mounted into the bearing seat 11, and accordingly assembling efficiency is improved.

In some embodiments, as shown in FIG. 5, the first buckle 12 on the first supporting wall 13 of the housing 1 is a first clamping groove, the first buckle 12 on the second supporting wall 14 is a first clamping bulge, the second buckle 21 on a bottom end of the first extension arm 22 of the bearing assembly 2 is a second clamping bulge, and the second buckle 21 on a bottom end of the second extension arm 23 is a second clamping groove. During assembling, the bearing assembly 2 is assembled onto the bearing seat 11 from top to bottom, the first extension arm 22 of the bearing assembly 2 extends into the inner side of the first supporting wall 13 and cooperates with the inner wall of the first supporting wall 13, at the same time the second extension arm 23 of the bearing assembly 2 extends into the inner side of the second supporting wall 14 and cooperates with the inner wall of the second supporting wall 14, and the second clamping bulge on the bottom end of the first extension arm 22 forms the buckle structure with the first clamping groove on the corresponding first supporting wall 13, and the second clamping groove on the bottom end of the second extension arm 23 forms the buckle structure synchronously with the second clamping bulge on the corresponding second supporting wall 14. In order to further facilitate assembling and ensure immobility of the buckle structure, in some embodiments, the second buckles 21 on the bottom ends of the first extension arm 22 and the second extension arm 23 are elastic buckles, and connected onto the first buckles 12 of the first supporting wall 13 and the second supporting wall 14 in a clamping manner through elastic deformation during assembling respectively.

Embodiment 3

The embodiment provides an air blowing apparatus having the bearing assembly mounting structure of the embodiment 2. In some embodiments, the air blowing apparatus is a tower fan. The tower fan includes a blade having a blade shaft, and the blade is mounted in a housing 1. A bearing assembly 2 supports the blade shaft 32 and fits the blade shaft 32 in a rotating manner.

Although the embodiments of the present disclosure are described in combination with the drawings, those skilled in the art may make various modifications and changes without departing from the spirit and scope of the present disclosure, and these modifications and changes shall fall within the scope defined by the appended claims.

What is claimed:

1. A bearing assembly, comprising:
a bearing sleeve, comprising an inner assembling face; and
a bearing, mounted into the bearing sleeve from an axial side of the bearing sleeve and comprising an outer assembling face corresponding to the inner assembling face, wherein, each of the inner assembling face and the outer assembling face is provided with a supporting structure protruding toward an opposing assembling face and cooperating with the opposing assembling face in a contacting manner, and the supporting structure is symmetrically disposed in a peripheral direction of the assembling face where the supporting structure is located;
or, the inner assembling face is provided with a supporting structure protruding toward the outer assembling face and cooperating with the outer assembling face in a contacting manner, and the supporting structure is symmetrically disposed in a peripheral direction of the outer assembling face where the supporting structure is located;
or, the outer assembling face is provided with a supporting structure protruding toward the inner assembling face and cooperating with the inner assembling face in a contacting manner, and the supporting structure is symmetrically disposed in a peripheral direction of the inner assembling face where the supporting structure is located;
wherein the bearing assembly further comprises an axial limiting structure disposed between the bearing sleeve and the bearing and configured to limit relative movement of the bearing sleeve and the bearing after assembling in an axial direction; the axial limiting structure comprises a convex section moulded on the inner assembling face and a groove section moulded on the outer assembling face, and the convex section cooperates with the groove section in a clamping manner after the bearing is mounted into the bearing sleeve.

2. The bearing assembly as claimed in claim 1, wherein, the supporting structure comprises a plurality of ribs which are disposed along an axial direction of the assembling face where the supporting structure is located.

3. The bearing assembly as claimed in claim 2, wherein, the plurality of ribs are uniformly disposed in the peripheral direction of the assembling face where the plurality of ribs are located.

4. The bearing assembly as claimed in claim 2, wherein, the plurality of ribs are provided on the outer assembling face of the bearing, and each of the plurality of ribs is provided with a chamfer angle on a front end along a direction of mounting the bearing in.

5. The bearing assembly as claimed in claim 1, wherein, the supporting structure comprises a plurality of round bulges.

6. The bearing assembly as claimed in claim 1, wherein, the axial limiting structure is positioned on a front side of the supporting structure in the direction of mounting the bearing.

7. The bearing assembly as claimed in claim 1, wherein, the convex section is provided with a supporting boss protruding toward the groove section and cooperating with a surface of the groove section on an opposite side in a contacting manner, so that a gap is formed between surfaces of the convex section and the groove section.

8. The bearing assembly as claimed in claim 1, wherein, the bearing assembly comprises a chamfer angle provided on a front end of the bearing.

9. The bearing assembly as claimed in claim 1, wherein, the inner assembling face and the outer assembling face are cylindrical surfaces.

10. A bearing assembly mounting structure, comprising:
a housing, the housing being provided with a bearing seat and a first buckle, and the baring seat, the first buckle and the housing being integrally moulded; and
the bearing assembly as claimed in claim 1, the bearing assembly being provided with a second buckle, and the second buckle cooperating with the first buckle when the bearing assembly is assembled to the bearing seat to form a buckle structure of locking the bearing assembly.

11. The bearing assembly mounting structure as claimed in claim 10, wherein, the bearing assembly is mounted into the bearing seat along a preset inserting direction, the first buckle is disposed on an inner side of the bearing seat along the preset inserting direction; the bearing assembly is provided with an extension arm extending toward the bearing seat, and the second buckle is moulded on the extension arm; when the bearing assembly is mounted into the bearing seat, the extension arm extends into the inner side of the bearing seat, so that the buckle structure is formed by the second buckle and the first buckle.

12. The bearing assembly mounting structure as claimed in claim 11, wherein, a first supporting wall and a second supporting wall, which are provided in parallel and disposed at intervals, are moulded on the housing; and the bearing seat is formed on a corresponding end of the first supporting wall and a corresponding end of the second supporting wall.

13. The bearing assembly mounting structure as claimed in claim 12, wherein, the second buckle is moulded on inner walls corresponding to the first supporting wall and the second supporting wall, respectively; the extension arm comprises a first extension arm and a second extension arm which are disposed on two axial ends of the bearing assembly; and the first extension arm and the second extension arm are formed with the second buckle.

14. The bearing assembly mounting structure as claimed in claim 13, wherein, the first extension arm and the second extension arm are positioned on inner sides or outer sides of the first supporting wall and the second supporting wall, and cooperate with corresponding inner walls or outer walls of the first supporting wall and the second supporting wall.

15. The bearing assembly mounting structure as claimed in claim 10, wherein, at least one of the first buckle and the second buckle is provided with a guiding slope configured to guide the first buckle and the second buckle to form the buckle structure.

16. The bearing assembly mounting structure as claimed in claim 10, wherein, the first buckle is a first clamping bulge or a first clamping groove, and the second buckle is a second clamping groove cooperating with the first clamping bulge or a second clamping bulge cooperating with the first clamping groove.

17. The bearing assembly mounting structure as claimed in claim 10, wherein, the at least one of the first buckle and the second buckle is an elastic buckle.

18. The bearing assembly mounting structure as claimed in claim 10, wherein, the bearing assembly is the one cooperating with a blade shaft of a cross-flow blade.

19. The bearing assembly mounting structure as claimed in claim 10, wherein, the bearing assembly comprises the bearing sleeve and the bearing, and the bearing is detachably mounted inside the bearing sleeve.

20. An air blowing apparatus, comprising:
a blade, having a blade shaft, the blade being mounted inside a housing; and
the bearing assembly mounting structure as claimed in claim 10, the bearing assembly supporting the blade shaft and cooperating with the blade shaft in a rotating manner.

21. The air blowing apparatus as claimed in claim 20, wherein, the air blowing apparatus is a tower fan.

* * * * *